United States Patent [19]
Gafken et al.

[11] Patent Number: 6,119,189
[45] Date of Patent: Sep. 12, 2000

[54] BUS MASTER TRANSACTIONS ON A LOW PIN COUNT BUS

[75] Inventors: Andrew H. Gafken, Folsom; Joseph A. Bennett, Rancho Cordova; David I. Poisner, Folsom, all of Calif.

[73] Assignee: Intel Corporation, Santa Clara, Calif.

[21] Appl. No.: 08/936,319

[22] Filed: Sep. 24, 1997

[51] Int. Cl.$^7$ .................. G06F 13/00; G06F 13/28
[52] U.S. Cl. .................................. 710/110; 710/22
[58] Field of Search .................. 395/290, 280, 395/281, 823, 309, 750.03; 340/825.06, 825.07; 710/110, 3, 129, 22, 100, 107, 33, 28; 713/320; 714/48; 711/100; 370/535; 365/230.02, 189.01

[56] References Cited

U.S. PATENT DOCUMENTS

| | | | |
|---|---|---|---|
| 3,633,166 | 1/1972 | Picard | 340/163 |
| 3,821,715 | 6/1974 | Hoff, Jr. et al. | 340/172.5 |
| 3,882,470 | 5/1975 | Hunter | 340/173 R |
| 3,924,241 | 12/1975 | Kronies | 340/172.5 |
| 3,972,028 | 7/1976 | Weber et al. | 340/172.5 |
| 4,007,452 | 2/1977 | Hoff, Jr. | 340/173 R |
| 4,099,231 | 7/1978 | Kotok et al. | 364/200 |
| 4,191,996 | 3/1980 | Chesley | 364/200 |
| 4,263,650 | 4/1981 | Bennett et al. | 364/200 |
| 4,286,321 | 8/1981 | Baker et al. | 364/200 |
| 4,306,298 | 12/1981 | McElroy | 364/900 |
| 4,315,308 | 2/1982 | Jackson | 364/200 |
| 4,315,310 | 2/1982 | Bayliss et al. | 364/200 |
| 4,333,142 | 6/1982 | Chesley | 364/200 |
| 4,373,183 | 2/1983 | Means et al. | 364/200 |
| 4,375,665 | 3/1983 | Schmidt | 364/200 |
| 4,443,864 | 4/1984 | McElroy | 364/900 |
| 4,449,207 | 5/1984 | Kung et al. | 365/230 |
| 4,470,114 | 9/1984 | Gerhold | 364/200 |
| 4,480,307 | 10/1984 | Budde et al. | 364/200 |
| 4,481,625 | 11/1984 | Roberts et al. | 370/85 |
| 4,488,218 | 12/1984 | Grimes | 364/200 |
| 4,513,370 | 4/1985 | Ziv et al. | 364/200 |
| 4,630,193 | 12/1986 | Kris | 364/200 |
| 4,660,141 | 4/1987 | Ceccon et al. | 364/200 |
| 4,675,813 | 6/1987 | Locke | 364/200 |
| 4,766,536 | 8/1988 | Wilson, Jr. et al. | 364/200 |
| 4,811,202 | 3/1989 | Schabowski | 364/200 |
| 4,920,486 | 4/1990 | Nielsen | 364/200 |
| 5,038,320 | 8/1991 | Heath et al. | 364/900 |
| 5,129,069 | 7/1992 | Helm et al. | 395/400 |
| 5,159,679 | 10/1992 | Culley | 395/425 |
| 5,175,831 | 12/1992 | Kumar | 395/425 |
| 5,214,767 | 5/1993 | Wanner et al. | 710/22 |
| 5,317,723 | 5/1994 | Heap et al. | 364/500 |
| 5,367,639 | 11/1994 | Sodos | 395/275 |
| 5,434,997 | 7/1995 | Landry et al. | 395/575 |
| 5,471,674 | 11/1995 | Stewart et al. | 395/650 |
| 5,475,854 | 12/1995 | Thomsen et al. | 395/800 |
| 5,561,819 | 10/1996 | Gephardt et al. | 710/27 |
| 5,561,821 | 10/1996 | Gephardt et al. | 395/848 |
| 5,579,530 | 11/1996 | Solomon et al. | 395/855 |
| 5,581,745 | 12/1996 | Muraoka et al. | 395/557 |
| 5,596,756 | 1/1997 | O'Brien | 395/750.08 |
| 5,619,728 | 4/1997 | Jones et al. | 395/847 |
| 5,634,099 | 5/1997 | Andrews et al. | 709/212 |
| 5,664,197 | 9/1997 | Kardach et al. | 395/728 |
| 5,768,622 | 1/1999 | Lory et al. | 395/855 |
| 5,793,990 | 1/1999 | Jirgal et al. | 395/287 |
| 5,838,993 | 1/1999 | Riley et al. | 395/842 |
| 5,841,715 | 11/1998 | Farmwald et al. | 365/203 |

OTHER PUBLICATIONS

PCI Local Bus Specification, Production Version Revision 2.1, Jun. 1, 1995, pp. 15 total.

Gilman D. Chesley, "Virtual Memory Integration", Sep. 1983, 4 pages total.

*Primary Examiner*—Gopal C. Ray
*Attorney, Agent, or Firm*—Blakely, Sokoloff, Taylor & Zafman LLP

[57] ABSTRACT

A system including a host, a peripheral controller device, and a bus master device each coupled to a bus having a plurality of general purpose signal lines for carrying time-multiplexed address, data, and control information. The bus master device communicates with the host and the peripheral controller device via the bus.

33 Claims, 8 Drawing Sheets

BUS MASTER TRANSACTIONS ON A LOW PIN COUNT BUS

CROSS-REFERENCE TO RELATED APPLICATIONS

This application is related to U.S. patent application Ser. No. 08/936,303 filed Sep. 24, 1997 entitled I/O TRANSACTIONS ON A LOW PIN COUNT BUS, U.S. patent application Ser. No. 08/936,318, filed Sep. 24, 1997 entitled DIRECT MEMORY ACCESS (DMA) TRANSACTIONS ON A LOW PIN COUNT BUS, and U.S. patent application Ser. No. 08/936,848, filed Sep. 24, 1997, entitled MEMORY TRANSACTIONS ON A LOW PIN COUNT BUS. Each of the above identified applications are assigned to the same assignee as the present application.

FIELD OF THE INVENTION

The present invention relates to computer systems. More particularly, the present invention relates to communicating between different types of devices on a low pin count bus in a computer system.

BACKGROUND

Conventional legacy-based computer systems include a variety of peripheral and memory devices that communicate with the system's chip-set or processor via an Industry Standard Architecture (ISA) bus or an Expansion bus (X-bus). The system chip-set or processor must include a large amount of pins (e.g., approximately 50–70 pins) and associated circuitry to support the ISA bus or X-bus signals that are used to interface the chip-set or processor with legacy-based peripheral devices including input/output (I/O) or I/O controller devices such as parallel port controllers, serial port controllers, super I/O controllers, floppy disk controllers, keyboard controllers, and memory devices such as non-volatile memory devices that store, for example, basic input-output services (BIOS) information.

The large number of pins needed to support the ISA bus and X-bus standards generally increases overall system cost. For example, larger packages are required for a chip-set or processor. Larger pin-count packages generally cost more than smaller pin-count packages, and are generally more susceptible to manufacturing quality and reliability problems during package assembly and system integration processes. Furthermore, larger pin-count packages require a greater amount of surface area on a printed circuit board (PCB) on which a computer system may be implemented. Therefore, it would be desirable to replace the ISA bus or X-bus in a computer system with a bus that would support the same types of peripheral devices, but utilize a relatively smaller number of pins or signal lines.

The ISA bus and X-bus standards also limit the amount of memory or I/O address space to 24 bits or approximately 16 MBytes of memory or I/O address space. As some processors and chip-sets can support 32 bits or 64 bits of address space, aliasing has previously been required to translate the processor address space to the ISA address space. Aliasing can produce significant overhead such that the performance of the computer system may be negatively impacted. Therefore, it would be desirable to replace the ISA bus and X-bus standards with a bus that may support an address space that is compatible with the processor or chip-set address space, and that potentially is unlimited.

The ISA bus and X-bus standards have a further disadvantage of being asynchronous. This generally increases design complexity for components that need to generate and respond to ISA bus and X-bus signals. Therefore, it would be desirable to replace the ISA bus and X-bus standards with a bus that may support synchronous communication between components so as to generally reduce the complexity of the bus interface circuitry.

SUMMARY OF THE INVENTION

A system is described including a host, a peripheral controller device, and a bus master device each coupled to a bus having a plurality of general purpose signal lines for carrying time-multiplexed address, data, and control information. The bus master device communicates with the host and the peripheral controller device via the bus.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A computer system with a low pin count (LPC) bus is disclosed. The LPC bus may replace the ISA bus or X-bus in a computer system while providing a communication mechanism between a host, such as a processor or chip-set, and peripheral devices, such as I/O or I/O controller devices and memory devices. For one embodiment, the LPC bus may include general purpose signal lines that carry substantially all time-multiplexed address, data, and control information to implement memory, I/O, direct memory access (DMA), and bus master transactions between the host and the peripheral devices.

An intended advantage of the LPC bus is that it may require significantly fewer signal lines (e.g., approximately 6–8 signal lines) to perform all of the functions previously performed by the approximately 50–70 signals lines of the ISA bus and X-bus standards. Since the number of signals lines for the LPC bus may be greatly reduced over the ISA bus and X-bus standards, the number of pins required on a computer system's chip-set or processor to support the LPC bus may be significantly reduced. Similarly, an LPC interface included within each peripheral device may use an equally small number of pins to interface with the chip-set or processor via the LPC bus. This may result in lower packaging costs for the component manufacturer and lower system costs for the computer system manufacturer. Additionally, this may result in higher quality and more reliable packaging and system integration.

Another intended advantage of the LPC bus is that memory and/or I/O address space is not limited to a particular number of address lines in a communication bus; rather, the LPC bus may serially carry as many address signals as are required to address any address space. Thus, conventional aliasing of memory or I/O address space may be avoided.

Another intended advantage of the LPC bus is that the LPC interface logic and/or software that may be used to interface a chip-set or processor with a peripheral device may be software compatible with existing computer systems employing ISA bus or X-bus standards. That is, no special driver or configuration is required by operating system software or application programs to run on an LPC bus system vs. ISA bus or X-bus systems.

Still another intended advantage of the LPC bus is that it may be a synchronous bus enabling LPC interface circuitry within host and peripheral devices to generally require less complex circuitry than asynchronous bus interface designs.

Figure 1:
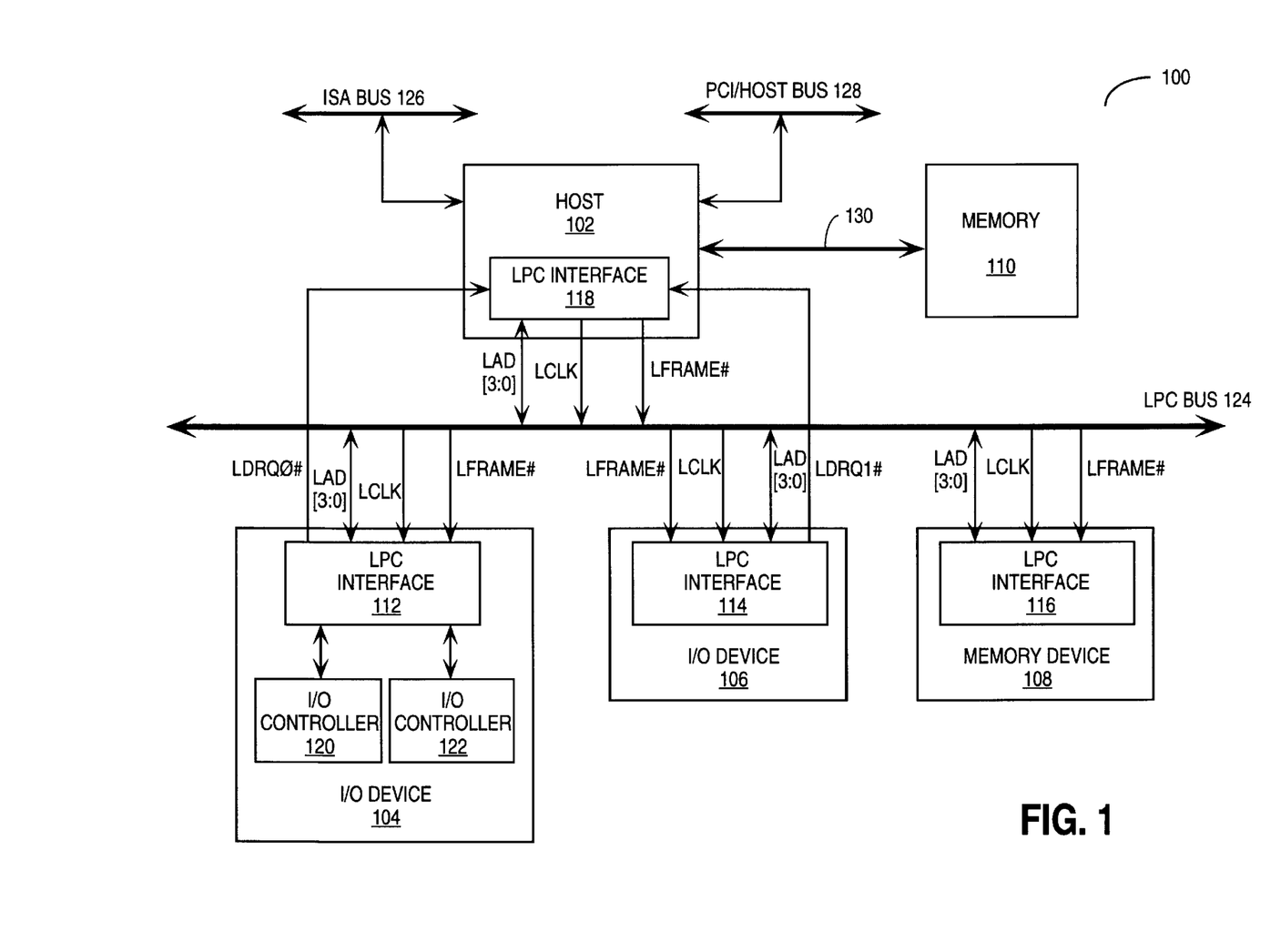
FIG. 1 is one embodiment of a computer system having a low pin count (LPC) bus.

FIG. 1 is one embodiment of computer system 100 including a host 102 coupled to peripheral devices including I/O or I/O controller devices 104 and 106, and memory device 108 via an LPC bus 124. Host 102 may be a chip-set, processor, or any other control logic that includes intelligence for interfacing with LPC bus 124. Host 102 may also include the necessary logic to interface with an optional ISA bus 126 and an optional PCI or Host bus 128. Host 102 communicates address, data, and control information with memory 110 over bus 130 that may be a local bus or other memory bus. Memory 110 may be the main or primary memory for system 100 such as dynamic random access memory (DRAM), static random access memory (SRAM), or any other type of volatile or non-volatile memory that may store, for example, operating system software, application code, or program data.

I/O devices 104 and 106, may be I/O controller devices that are addressable in I/O address space and control access to peripheral components 25 such as floppy disk drives, keyboards, and the like. I/O devices 104 and 106 may each be, for example, a floppy disk controller, a serial port controller, a parallel port controller, an infra-red (IR) controller, a keyboard controller, audio controller device, or video controller device. I/O device 104 may be a Super I/O device that includes I/O controllers 120 and 122 that may each be, for example, a floppy disk controller, a serial port controller, a parallel port controller, an infra-red (IR) controller, a keyboard controller, audio controller device, or video controller device.

Memory device 108 is a peripheral device that is addressable in memory space. For example, memory device 108 may include any type of volatile or nonvolatile memory such as DRAM, SRAM, flash memory, electrically programmable read only memory (EPROM), electrically erasable programmable read only memory (EEPROM), magnetic storage media, or optical storage media. Memory device 108 may store system start-up code, manageability code, operating system data, application code, program data, or function as a scratch pad for host 102 or I/O devices 104 and 106. System start-up code may include the necessary software to configure or boot components within system 100, and may include BIOS information.

Each of host 102 and the peripheral devices 104, 106, and 108 include LPC interfaces 118, 112, 114, and 116, respectively, for generating LPC signals and for responding to LPC signals on LPC bus 124. These LPC interfaces may enable system 100 to implement memory, I/O, DMA, and bus master transactions over LPC bus 124. Each LPC interface has either input or output pin(s) to receive or transmit signals LAD[3:0], LCLK, and LFRAME#. Note that a pound symbol "#" following a signal name indicates that the signal is an active low signal. For alternative embodiments, active low signals may be altered to be active high signals.

The LAD[3:0] signal lines are general purpose signal lines that carry time-multiplexed address, data, and control information over LPC bus 124 and between host 102 and peripheral devices 104, 106, and 108. Whether LAD[3:0] is carrying address, data, or control information at any given time may be determined by the operating context of system 100 as will be described in greater detail below. While LAD[3:0] is illustrated as a four-bit bus, it may include any number of signal lines to carry out an intended purpose of carrying time-multiplexed address, data, and control information. A four-bit nibble-sized bus may be advantageous to reduce the number of pins required on each of the LPC interfaces 112–118 and reduce the number of pins and package sizes of host 102 and peripheral devices 104, 106, and 108.

LCLK is a clock signal that may be generated by LPC interface 118 or by other circuitry within host 102 (not shown). Alternatively, LCLK may be generated by a system clock (not shown) including a crystal or other timing circuitry. For one embodiment, LCLK may be the PCI clock from PCI bus 128.

LFRAME# is generated by LPC interface 118 of host 102 to indicate the start and/or end of LPC transactions or cycles. Each of LPC interfaces 112, 114, and 116, may monitor or sample LFRAME# to determine when an LPC transaction may begin or end. For example, when LFRAME# is asserted (e.g., low) by host 102, LPC interfaces 112, 114, and 116 of peripheral devices 104, 106, and 108, respectively, monitor LAD[3:0] to determine whether the transaction or cycle is for them. Advantageously, when a transaction is not intended for a particular peripheral device, that peripheral device may enter a lower power mode and may de-couple its state machines from the bus and/or gate its clocks. If LFRAME# is asserted for more than one LCLK cycle, then LPC interfaces 112, 114, and 116 may only react to the start control information on LAD[3:0] during the last LCLK cycle that LFRAME# is active. Table 1 summarizes exemplary definitions of the start control information on LAD[3:0] while LFRAME# is asserted.

TABLE 1

| LAD[3:0] | Function |
|---|---|
| 0000 | Start of transaction |
| 0001 | Reserved |
| 0010 | Grant for bus master 0 |
| 0011 | Grant for bus master 1 |
| 0100 | Reserved |
| 1101 | Memory read |
| 1110 | Memory write |
| 1111 | Stop/Abort transaction |

LFRAME# may also be used to abort or end LPC transactions. For example, LPC interfaces 112, 114, and 116 of peripheral devices, 104, 106, and 108, respectively, continue to monitor LFRAME# during LPC transactions. If LFRAME# is asserted during an LPC transaction, the peripheral devices 104, 106, and 108 will stop driving LAD[3:0] and abort their LPC transaction. For one embodiment, host 102 asserts LFRAME# for a number of LCLK cycles (e.g., four clock cycles) to ensure that the abort indication is recognized by all peripheral devices. During one or more of these LCLK cycles, host 102 may also drive predetermined data on LAD[3:0]. For one embodiment, host 102 drives 1111 on LAD[3:0] while LFRAME# is asserted to indicate an abort sequence. At the end of the abort sequence, LFRAME# may be deasserted before a new LPC transaction commences.

For alternative embodiments, LFRAME# may be used between any two devices (e.g., a host and peripheral device) in any system as an independent control signal on an independent control line (apart from a bus) to communicate the start or abortion of a transaction such as a memory, I/O, bus master, or DMA transaction.

LPC bus 124 may also include a reset signal LRESET# input into each of LPC interfaces 112, 114, 116, and 118 and that resets the LPC interfaces to a known state (e.g., an idle state). For one embodiment, LRESET# may be the same reset signal as a PCI reset signal on PCI bus 128.

I/O devices 104 and 106 may also have DMA request signals LDRQ0# and LDRQ1#, respectively, provided on separate control lines to LPC interface 118 of host 102. LDRQ0# and LDRQ1# may be used to transmit encoded DMA channel requests to host 102 prior to performing a DMA or bus master transaction. Each I/O device may have one unique LDRQ# signal such that peripheral device I/O controllers 120 and 122 share one DMA channel request on LDRQ0#.

Figure 8:
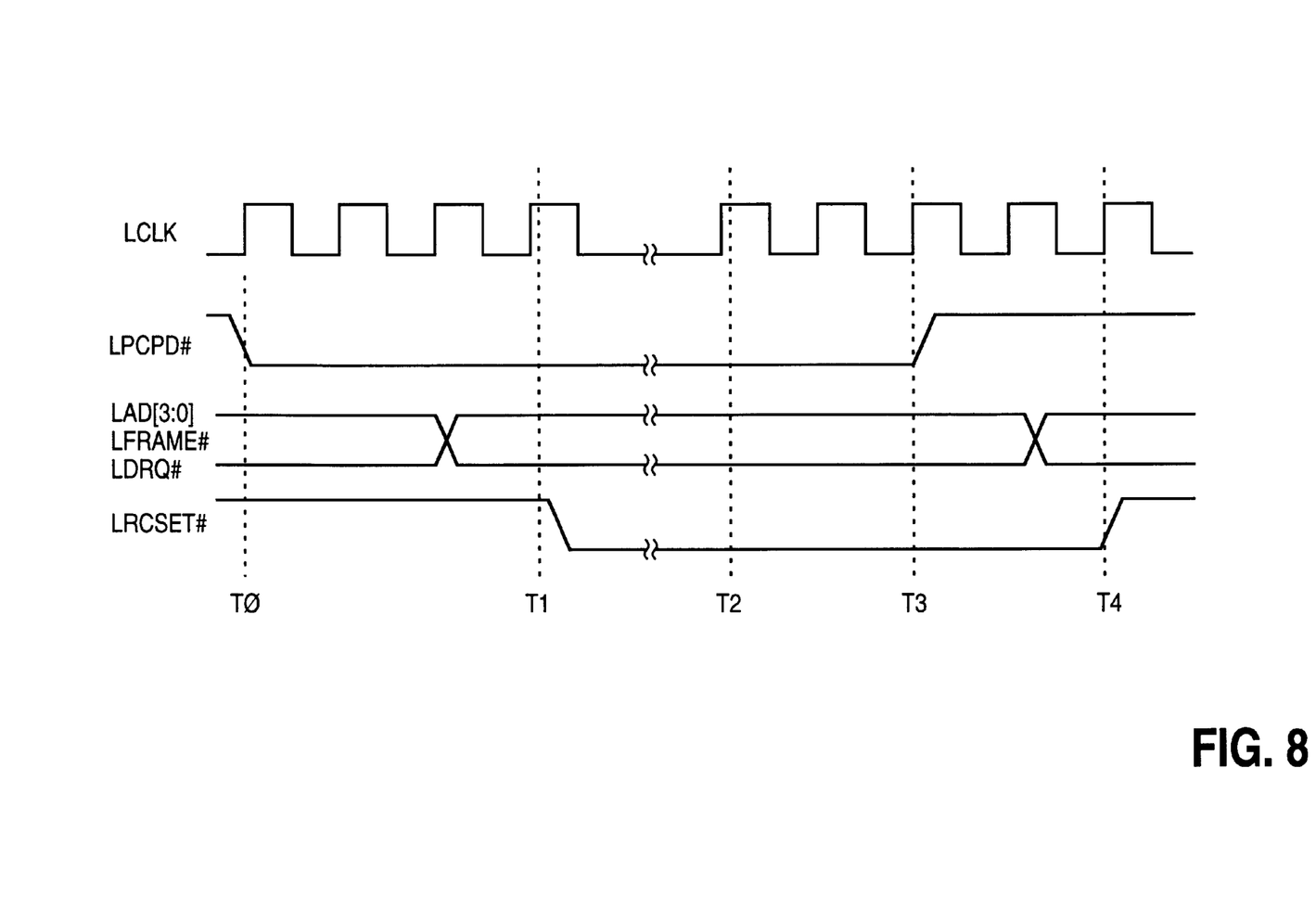
FIG. 8 is one embodiment of a timing diagram for a low power mode of operation.

LPC bus 124 may also include a low power or standby signal LPCPD# that may be output by host 102 to each of peripheral devices 104–108 on a separate control line. As illustrated in FIG. 8, host 102 may assert LPCPD# (e.g., low) asynchronously at time t0 to cause peripheral devices 104–108 to enter a low power mode. Upon recognizing LPCPD# asserted by host 102, peripheral devices 104–108 will halt any LPC transactions and tri-state or drive the LDRQ# signals inactive. Peripheral devices 104–108 and/or host 102 may also tri-state or drive LAD[3:0] to a known state. Host 102 may also drive LFRAME# to a known state (high or low) after asserting LPCPD#. In the low power mode, LCLK may be shut off at time t1 and peripheral devices 104–108 may shut off their states machines and/or other logic. For one embodiment, the time difference between t0 and t1 is at least 30 microseconds. When exiting the low power mode, LCLK may be restarted asynchronously at time t2 and may run for a period of time before LPCPD# may be deasserted at time t3. For one embodiment, the time difference between t2 and t3 is at least 100 microseconds. LRESET# may then be used to reset peripheral devices 104–108 from time t3 to t4. For one embodiment, the difference between times t3 and t4 is at least 60 microseconds.

Host 102 and peripheral devices 104–108 may also have additional sideband input and/or output signals utilized in ISA or PCI busses, including interrupt signals (e.g., SERIRQ and SMI#), additional clock signals (e.g., CLKRUN#), and power management signals as will be described in more detail below.

By utilizing approximately 6–9 signal lines, in one embodiment, LPC bus 124 may provide substantial signal and pin-count savings over conventional ISA bus or X-bus parts or systems. For example, the following ISA bus or X-bus signals typically found on plug-n-play devices may no longer be required: D[7:0], SA[15:0], DREQ[3:0], DACK#[3:0], TC, IOR#, IOW#, IOCHRDY, IOCS16#, and MEMCS16#. This may result in a savings of approximately 30–40 signals on the bus, the host, and/or peripheral devices. For one embodiment, a fully functional Super I/O peripheral controller device that may have required as large as a 160 pin package under ISA or X- bus compatible situations, may require an 88 pin (or less) package using an LPC interface as illustrated in FIG. 1.

The LPC bus may be used by the LPC interfaces 112–118 to perform memory, I/O, DMA, and bus master transactions or cycles including memory read, memory write, I/O read, I/O write, DMA read, DMA write, bus master memory read, bus master memory write, bus master I/O read, and bus master I/O write. The type of transaction may be indicated in a field of cycle type and direction control information driven on LAD[3:0] by host 102 or peripheral devices 104, 106, and 108. One embodiment of the cycle type and control information encoded on LAD[3:1] is shown in Table 2. Other encodings on may be used.

TABLE 2

| LAD[3:1] | Transaction |
|---|---|
| 000 | I/O Read |
| 001 | I/O Write |
| 010 | Memory Read |
| 011 | Memory Write |
| 100 | DMA Read |
| 101 | DMA Write |
| 110-111 | Reserved |

Figure 2:
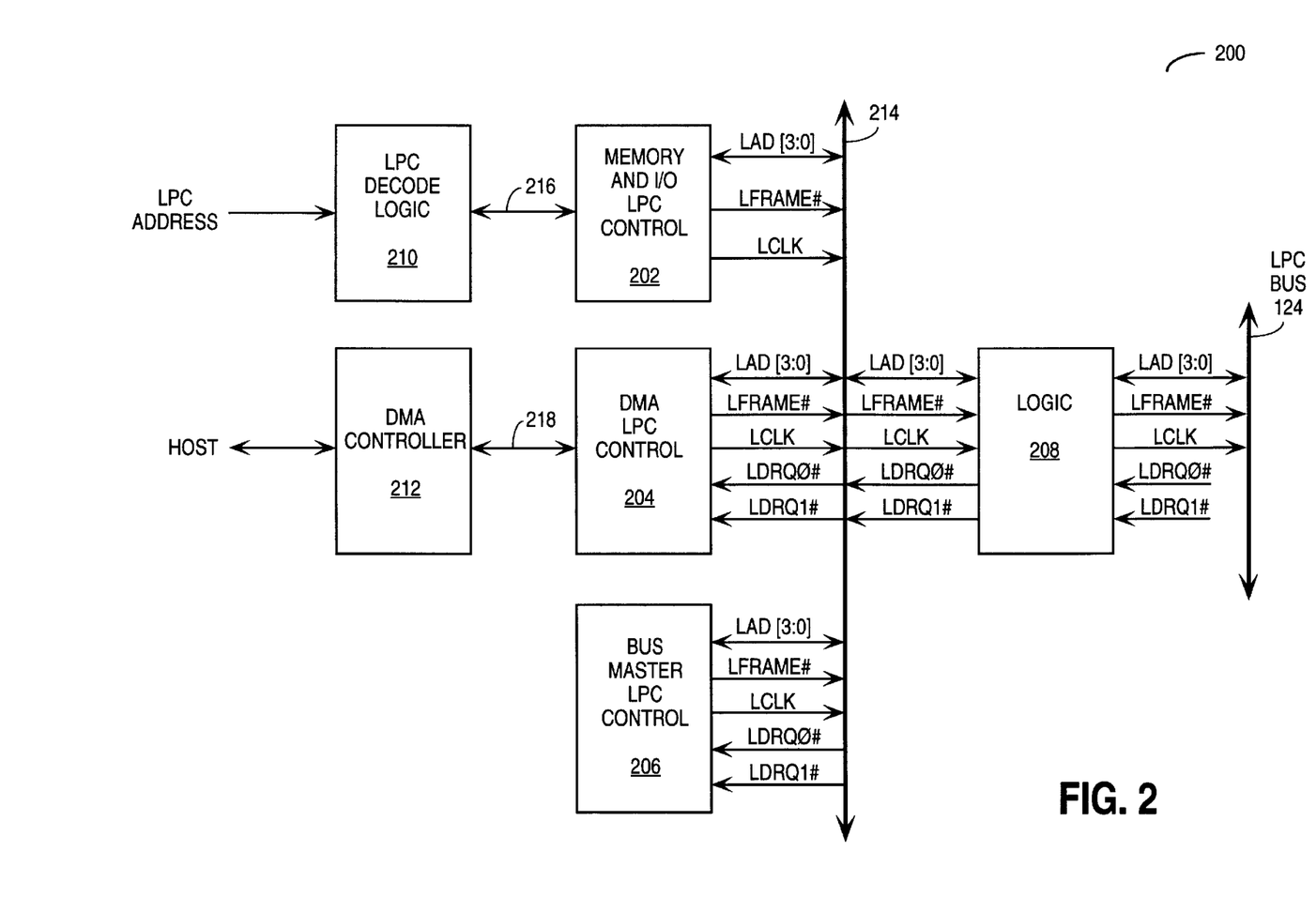
FIG. 2 is one embodiment of an LPC interface for a host.

FIG. 2 shows LPC interface 200 that is one embodiment of LPC interface 118 of host 102. LPC interface 200 generates and interprets the address, data, and control information on LPC bus 124 to implement the transactions of TABLE 2. LPC interface 200 includes memory and I/O LPC control logic 202 that may control memory read, memory write, I/O read, and I/O write LPC transactions between host 102 and one of peripheral devices 104–108. Memory and I/O LPC control logic 202 may include a state machine or sequencer for sequencing between the states necessary for the particular LPC transaction, and for generating address, data, or control information on LAD[3:0], LFRAME#, and/or LCLK. The information provided on LAD[3:0], LFRAME#, and/or LCLK may be provided to bus 214 for output by logic 208 to LPC bus 124.

For one embodiment, memory and I/O LPC control logic 202 determines that an LPC memory or I/O transaction may be required to be performed by communicating with LPC decode logic 210 over one or more signals 216. LPC decode logic 210 may receive memory or I/O read or write request and an associated address from host 102, ISA bus 126, or PCI or host bus 128. LPC decode logic may decode the address and signal memory and I/O LPC control logic 202 to begin a memory or I/O LPC transaction. LPC decode logic 210 may alternatively be located outside of LPC interface 200 but within host 102. The decoded address ranges for peripheral device 104–108 may be defined so as to be compatible with previous ISA bus and X-bus legacy based peripheral devices to aide is making LPC transactions software transparent to operating system software and application software. For an alternative embodiment, control of the memory and I/O LPC transactions may be separated into different control circuits.

LPC interface 200 also includes DMA LPC control logic 204 that controls DMA read and write LPC transactions between host 102 and one of I/O devices 104 and 106. DMA LPC control logic 204 may include a state machine or sequencer for sequencing between the states necessary for the DMA LPC transaction, and for generating address, data, or control information on LAD[3:0], LFRAME#, and/or LCLK, and for receiving DMA request signals LDRQ0# and LDRQ1#. The information provided on LAD[3:0], LFRAME#, LDRQ0#, LDRQ1#, and/or LCLK may be provided to or from LPC bus 124 via logic 208 and bus 214.

DMA LPC control logic 204 may interface with host 102 and memory 110 via DMA controller 212 that may reside in host 102. DMA LPC control logic 204 may communicate with DMA controller 212 over one or more signals 218. For one embodiment, DMA controller 212 may include one or more 8237 or 8237-compatible DMA controllers. DMA controller 212 may perform arbitration within host 102 on behalf of a DMA channel such that the I/O device using that DMA channel may communicate with main memory 110 via host 102.

LPC interface 200 may also include bus master LPC control logic 206 that control bus master memory read and write LPC transactions, and bus master I/O read and write LPC transactions between host 102 and peripheral devices 104–108. Bus master LPC control logic 206 may include a state machine or sequencer for sequencing between the states necessary for the bus master LPC transactions, and for generating address, data, or control information on LAD [3:0], LFRAME#, and/or LCLK, and for receiving DMA request signals LDRQ0# and LDRQ1#. The information provided on LAD[3:0], LFRAME#, LDRQ0#, LDRQ1#, and/or LCLK may be provided to or from LPC bus 124 via logic 208 and bus 214.

Logic 208 may comprise one or more buffers or transceivers for interfacing LPC bus 124 with LPC bus 214. Alternatively, LPC interface 200 may not include bus 214; rather, logic 208 may be connected directly and individually to the input and output signals of memory and I/O LPC control logic 202, DMA LPC control logic 204, and bus master LPC control logic 206. For this alternative embodiment, logic 208 may be a selector or multiplexer circuit that outputs or inputs the appropriate LPC signals to and from LPC bus 124 and control logic 202, 204, and 206 under the control of host 102.

Figure 3:
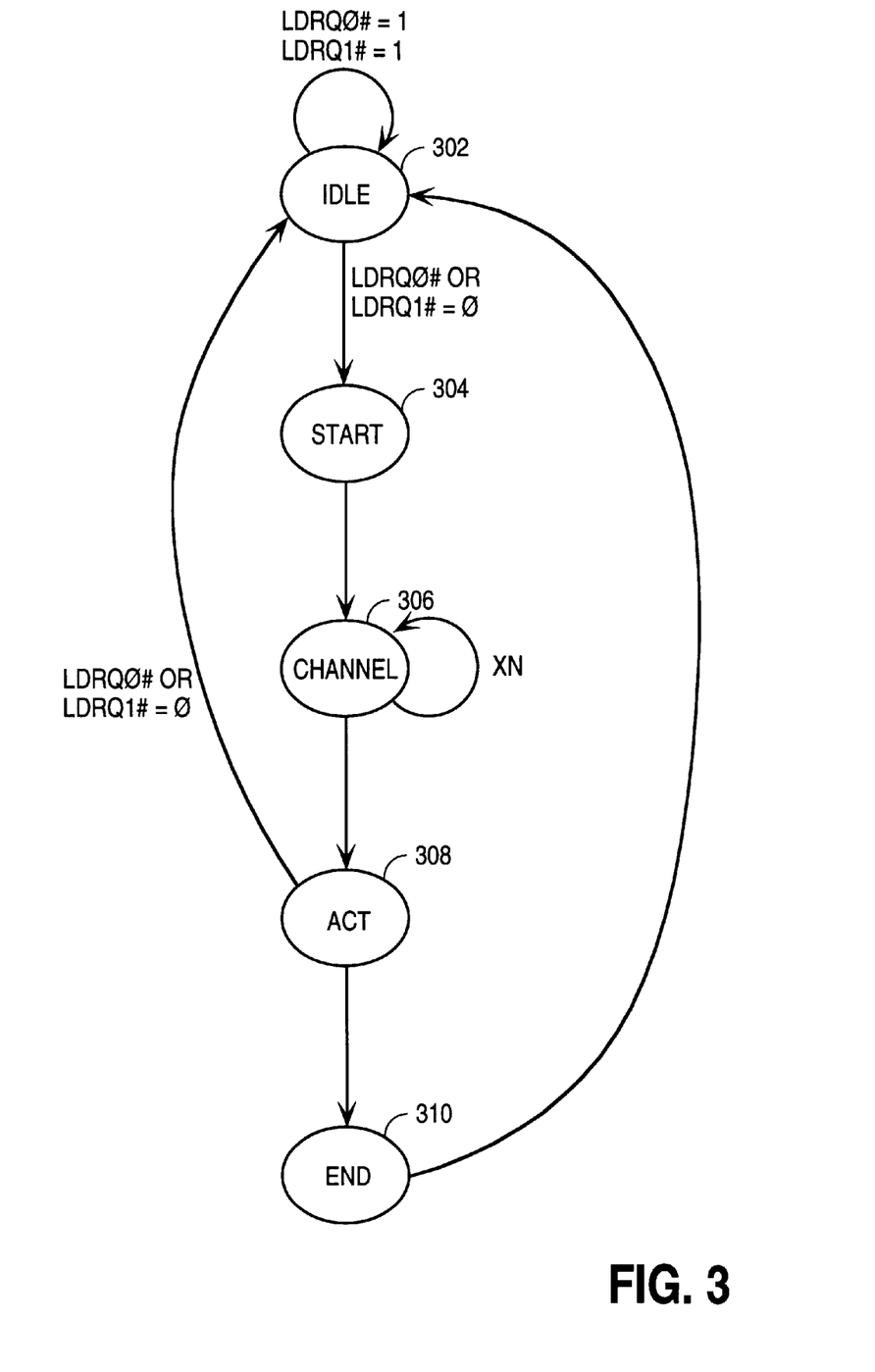
FIG. 3 is one embodiment of a state machine diagram for implementing a direct memory access (DMA) request for a bus master transaction.

FIG. 3 is one embodiment of a state diagram for performing a DMA request on one or more of the DMA request control lines LDRQ0# or LDRQ1#. A DMA request may be used by peripheral devices 104 and 106 to gain control of LPC bus 124 and perform a bus master transaction including writing directly to memory device 108, reading directly from memory device 108, writing directly to another I/O or peripheral device, or reading directly from another I/O or peripheral device. The DMA request may encode a particular DMA channel number on LDRQ0# or LDRQ1# to identify the DMA request as a bus master request.

The state diagram of FIG. 3 may be implemented by state machines or control logic in LPC interface 118 of host 102 (e.g., DMA LPC control logic 204 or bus master LPC control logic 206 of FIG. 2), or by state machines or control logic in LPC interfaces 112, 114, and 116 of peripheral devices 104, 106, and 108, respectively. For alternative embodiments, the state diagram may be implemented by state machines or control logic in any system having a host device and an I/O device that requests a DMA channel over a control line that is independent of a general purpose bus.

Figure 4:
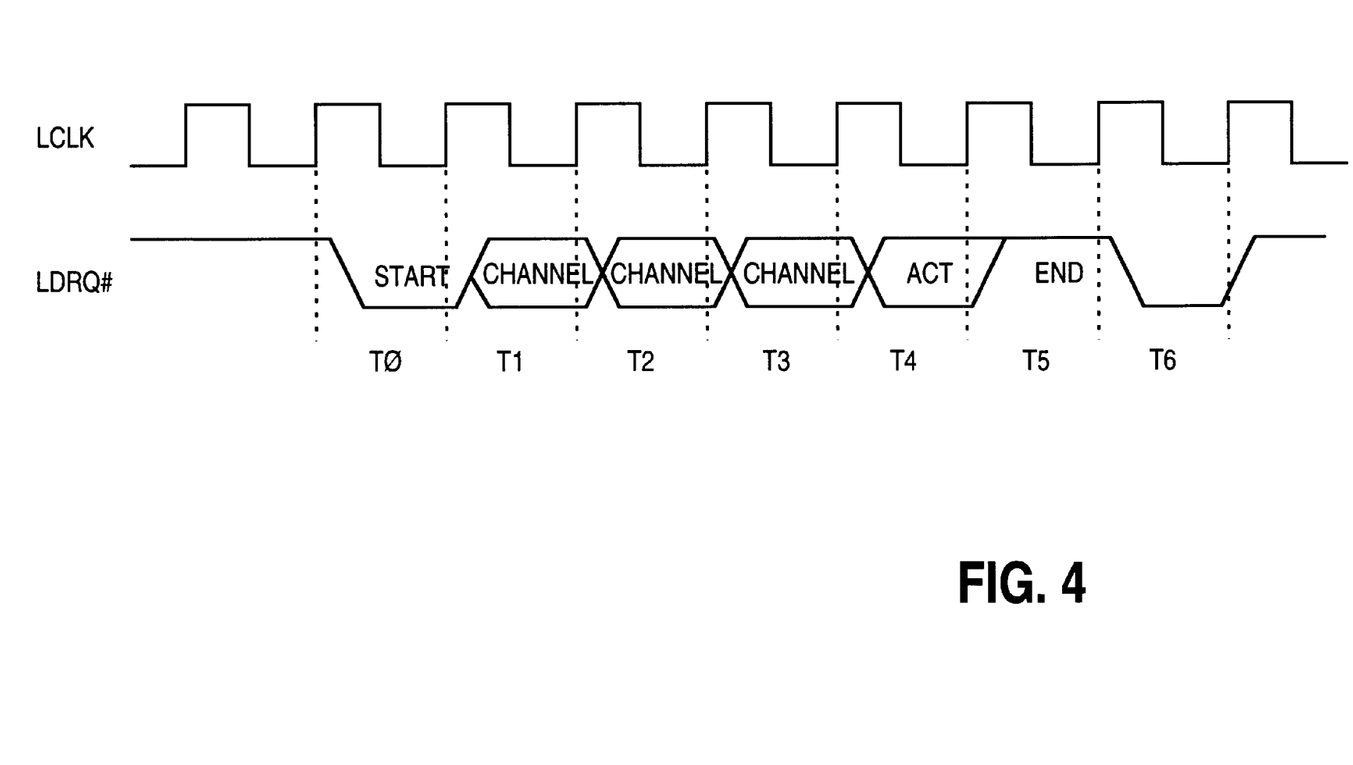
FIG. 4 is one embodiment of a DMA request transaction.

The operation of FIG. 3 will be described with the aide of the exemplary timing diagram of FIG. 4. In state 302, LPC interfaces 112, 114, and 116 are in an idle DMA state with LDRQ0# and LDRQ1# deasserted (e.g., high). When, for example, I/O device 104 asserts LDRQ0# (e.g., low) to request a bus master transaction from host 102, the process transitions to start state 304 during cycle TO. Host 102 recognizes that LDRQ0# has been asserted and prepares to receive a requested DMA channel number from I/O device 104.

The process then transitions to state 306 where the requested channel number may be serially and synchronously transmitted on LDRQ0# from I/O device 104 to host 102 during clock cycles Ti, T2, and T3. Three clock cycles may be used to encode up to eight different DMA channels using a binary format. Any one of these DMA channel numbers may indicate that a bus master transaction is requested by I/O device 104. For one embodiment, a DMA channel number of 100 may be used and transmitted in cycles Ti, T2, and T3, respectively. For alternative embodiments, a different number of serial bits may be transmitted to encode any number of DMA channels. For yet other embodiments, encoding schemes other than a binary encoding scheme may be used. The channel number may also be serially transmitted most significant bit first, least significant bit first, or in any other order expected by host 102.

After the channel number has been transmitted, the process transitions to state 308 in which I/O device 104 sends an active bit (ACT) or signal to host 102 on LDRQ0# in clock cycle T4. The ACT bit may indicate if the current DMA request is an active or inactive request. For example, if the ACT bit is active (e.g., high), the current DMA request for a bus master transaction may be valid. After an active ACT bit is received by host 102, I/O device 104 may drive LDRQ0# to a predetermined state (e.g., high or low) for one or more clock cycle(s) T5 in end state 310. A bus master transaction may then occur starting at cycle T6 or at any time thereafter. If, however, the ACT bit is inactive (e.g., low), host 102 may interpret this DMA request as attempting to abandon a previous DMA request for a bus master transaction. That is, when ACT is inactive, I/O device 104 may request that host 102 abandon a previous DMA request for a bus master transaction.

After a request for a bus master transaction has been made, host 102 may provide an indication to I/O devices 104 and 106 that the bus master transaction has been granted. A bus master transaction may then occur between peripheral devices 104–108 over LPC bus 124.

Figure 5:
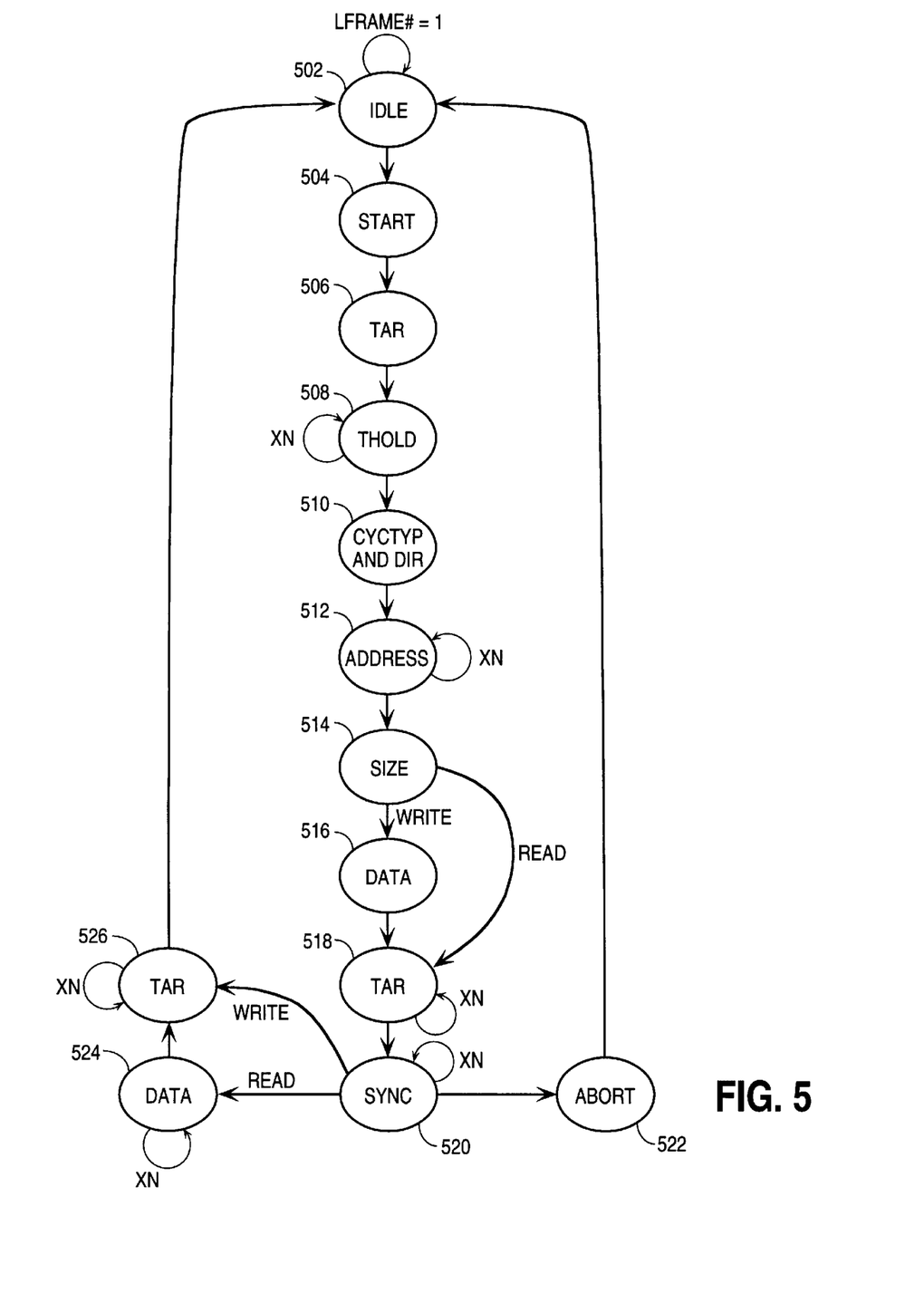
FIG. 5 is one embodiment of a state machine diagram for implementing bus master transactions between a bus master device and a peripheral controller device or a memory device.

FIG. 5 is one embodiment, of a state diagram for implementing bus master write and read transactions between peripheral devices 104–108 that may occur over LPC bus 124. The state diagram of FIG. 5 may be implemented in one or more of LPC interfaces 112, 114, 116, and 118. For one embodiment, the state diagram of FIG. 5 may be implemented in bus master LPC control logic 206 of FIG. 2.

Figure 6:
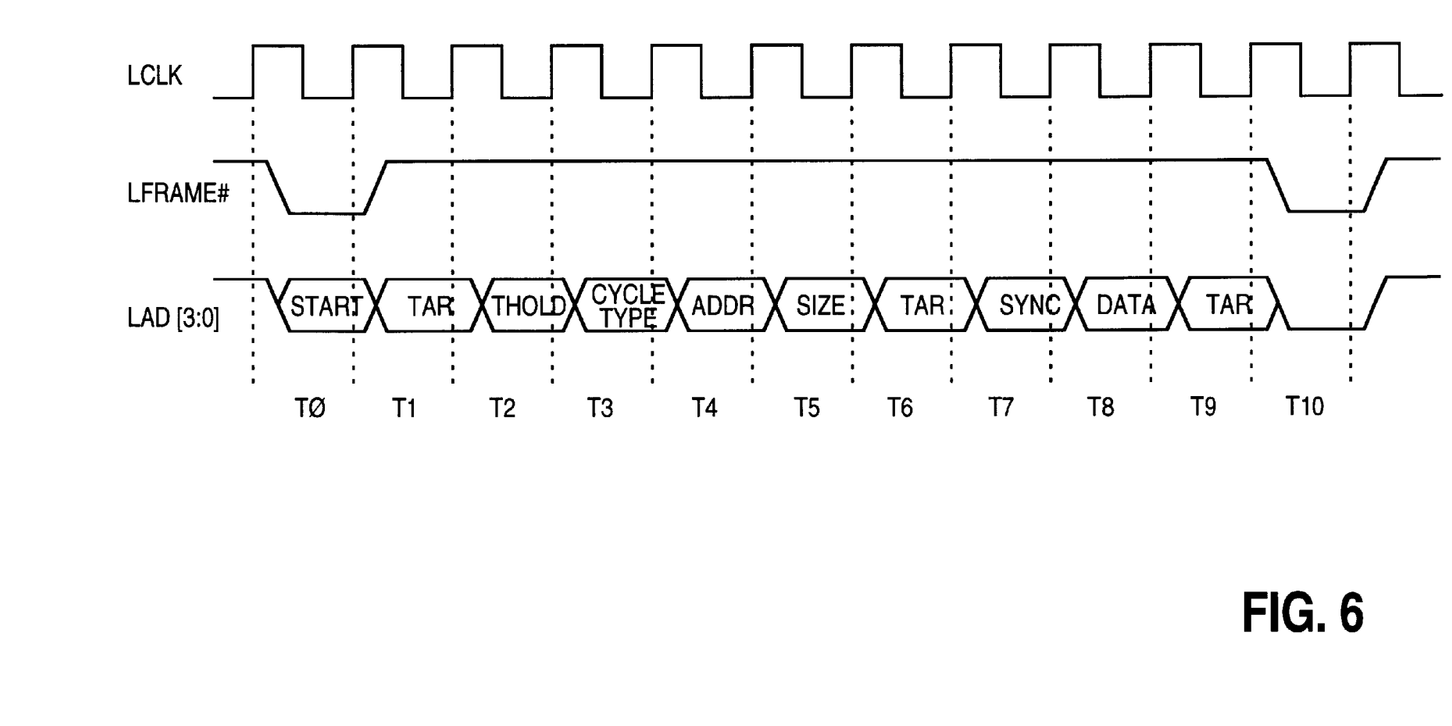
FIG. 6 is one embodiment of a bus master read transaction.

A bus master read transaction by, for example, I/O device 104 of data from I/O device 106 or memory device 108 will be described with the aid of FIG. 5 and the exemplary timing diagram of FIG. 6. The bus master read transaction may comprise I/O device 104 reading data files, driver information, application codes, or the like from a register or FIFO in I/O device 106 or from a memory location in memory device 108.

The process begins at idle state 502 when LFRAME# is deasserted (e.g., high). When host 102 is ready to grant I/O device 104 access to the bus for a previously requested bus master transaction, the process may transition to state 504 and host 102 asserts LFRAME# (e.g., low) during cycle T0. Host 102 also drives start control information indicating the start of a bus master transaction on LAD[3:0] during cycle T0. For one embodiment, host 102 may support two bus masters attached to LPC bus 124 and the start control information may indicate which bus master is granted access to LPC bus 124 (e.g., 0010 or 0011 on LAD[3:0]) as indicated in Table 1. Alternatively, host 102 may support any number of bus master devices.

The process may transitions to turn around (TAR) state 506 to turn control of LPC bus 124 over I/O device 104 during n clock cycle(s) T1. Control of LPC bus 124 may be turned over to I/O device 104 such that it may function as a bus master device and control LAD[3:0]. For one embodiment, state 506 is two clocks wide. In the first clock cycle host 102 drives LAD[3:0] lines with predetermined control information (e.g., 1111). In the second clock cycle, host 102 may tri-state LAD[3:0] lines. These lines may have weak pull-ups attached to these lines so that they may remain at a logical high states. For other embodiments, n may be one clock cycle or greater than two clock cycles to turn around LAD[3:0].

The process then transitions to a hold state 508 for n clock cycles T2 to synchronize LPC interface 112 with sampled signals on LAD[3:0]. This state is optional and may by omitted.

The process then transitions to state 510 in which I/O device 104 may 2;: drive cycle type and direction control information on LAD[3:0] during cycle T3. The cycle type and direction control information may indicate to I/O device 106 and memory device 108 the type and direction of the bus master transaction. For example, the cycle type and direction control information on LAD[3:1] may indicate a bus master read or write transaction with I/O device 106 or memory device 108 as indicated in Table 2. For one example, the cycle type and direction control information may be 000 on LAD[3:1] to indicate a bus master read transaction from I/O device 106, 001 on LAD[3:1] to indicate a bus master write transaction to I/O device 106, 010 on LAD[3:1] to indicate a bus master read transaction from memory device 108, or 011 on LAD[3:1] to indicate a bus master write transaction to memory device 108. Other encodings on LAD[3:0] may be used.

The process then transitions to state 512 and I/O device 104 may drive an address of a memory location in memory device 108, or an address of a location in I/O device 106, on LAD[3:0] during n clock cycles T4. The address may be any length of bits supported by a system such as system 100 of FIG. 1, and sent over a number of n clock cycles T4. For one embodiment, the memory address space may be 4 GBytes requiring 32 bits of memory address. For this embodiment, eight clock cycles of address information may be provided to LPC bus 124 to transfer 8 nibbles (32 bits) of address information from I/O device 104 to memory device 108. The address information may be provided most significant nibble first, least significant nibble first, or in any other order expected by memory device 108. For another embodiment, the I/O address space may be 64 KBytes requiring 16 bits of I/O address. For this embodiment, four clock cycles of address information may be provided to LPC bus 124 to transfer 4 nibbles (16 bits) of address information from I/O device 104 to I/O device 106. The address information may be provided most significant nibble first, least significant nibble first, or in any other order expected by I/O device 106.

The process then transitions to state 514 and drive a field of size control information on LAD[3:0] during cycle T5. The size control information may indicate the number of bytes of data to be read from or written to memory device 108 or I/O device 106 starting at the address provided in state 512. Table 3 provides one embodiment of encoding the number of bytes on LAD[1:0] to be subsequently transferred over LAD[3:0]. Other encodings on the same or different LAD signal lines may also be used.

TABLE 3

| LAD[1:0] | Size |
| --- | --- |
| 00 | 8 bits (1 byte) |
| 01 | 16 bits (2 bytes) |
| 10 | Reserved |
| 11 | 32 bits (4 bytes) |

For another embodiment, the size control information may indicate that $2^{size}$ number of bytes of data to be read from or written to memory device 108 or I/O device 106 starting at the address provided in state 512.

For yet another embodiment, the size control information and clock cycle T5 may be omitted.

For one embodiment, data transfers may be aligned to $2^{size}$ boundary by host 102. For example, if the size field is equal to 0100 on LAD[3:0], then the operation is aligned to a 16 byte boundary and memory device 108 should accept or send 16 bytes of data beginning from a 16 byte aligned address. For another embodiment, data transfers may be aligned to a size boundary as in Table 3. For example, if size is equal to 0010 on LAD[3:0], then the operation is aligned to a 16 bit or word boundary and memory device 108 should accept or send 16 bits of data beginning from a 16 bit or word aligned address.

The process may then transition to turn around (TAR) state 518 to turn control of LPC bus 124 over to I/O device 106 or memory device 108 during n clock cycle(s) T6. Control of LPC bus 124 may be turned over to I/O device 106 or memory device 108 such that it may output data to LAD[3:0]. For one embodiment, state 518 is two clocks wide. In the first clock cycle I/O device 104 drives LAD[3:0] lines with predetermined control information (e.g., 1111). In the second clock cycle, I/O device 104 may tri-state LAD [3:0] lines. For other embodiments, n may be one clock cycle or greater than two clock cycles to turn around LAD[3:0].

The process then transitions to state 520 and wait n clock cycles while memory device 108 drives inband synchronization control information on LAD[3:0] during n clock cycle(s) T7. The synchronization control information may be used to add wait states until the requested data from memory device 108 or I/O device 106 is ready to be output to LAD[3:0]. In this manner, peripheral devices of differing speeds or access times may be coupled to the same LPC bus, because the LPC interface of the peripheral device may continue to drive wait states onto LAD[3:0] of the LPC bus 124 until the requested data is ready to be output. Conventionally, a dedicated control signal on a dedicated control line was used to indicate when data was ready (e.g., IOCHRDY in the ISA bus or X-bus). In contrast, memory device 108 or I/O device 106 can se inband signaling on LAD[3:0] to insert wait states without requiring the use of an additional dedicated pin or signal line.

For one embodiment, the synchronization control information field has two phases. The first phase drives first control information (e.g., 0101 or 0110) on LAD[3:0] while accessing the requested data. The second phase drives second control information on LAD[3:0] (e.g., 0000) indicating that the data is ready to be output to LPC bus 124. I/O device 104 monitors the synchronization control information and determines that when the second information is sent, then the data output by memory device 108 or I/O device 106 in subsequent clock cycles T8 will be the data requested by LPC interface 118. For one embodiment, the first control information may have an encoding (e.g., 0110 on LAD[3:0]) that indicates that a relatively large number of wait states will be driven onto LAD[3:0] (e.g., approximately 20+wait states). The first control information may also have an encoding (e.g., 0101 on LAD 3:0]) that indicates that a relatively small number of wait states will be driven onto LAD[3:0] (e.g., approximately 1–20 wait states). For one example (see Table 4 below), memory device 108 or I/O device 106 may drive synchronization data of 0101 on LAD[3:0], respectively, for approximately 1–20 clock cycles and then drive one cycle of 0000 on LAD[3:0], respectively, to indicate that the requested data is ready and will be output on the following clock cycle.

If the number of wait states is large, I/O device 104 may decide to abort the transaction by entering state 522. As previously described, host 102 may abort the transaction by asserting LFRAME# for one or more clock cycles and driving predetermined abort control information (e.g., 1111 as in Table 1) on LAD[3:0] to abort the bus master transaction.

The synchronization field of control information may also be used to send an inband error message on LAD[3:0] to I/O device 104. The error message may be sent at any time during the synchronization sequence. For example, it may be sent as the second control information in the embodiment having first and second synchronization control information. The error message may indicate, for example, that the data requested is corrupted in some way, the peripheral device does not understand the request, an invalid request was made, or that a request has been made while the peripheral device is in a power down mode or is in another mode in which it is not ready or able to output data. For one embodiment, if an error message is sent during a bus master read transaction, then the data is read out and disregarded.

Table 4 provides one embodiment of encodings on LAD [3:0] for the synchronization control information described above. Other encodings may also be used.

TABLE 4

| LAD[3:0] | Indication |
| --- | --- |
| 0000 | Ready |
| 0001–0100 | Reserved |
| 0101 | Short Wait |
| 0110 | Long Wait |
| 0111–1000 | Reserved |
| 1001 | DMA Ready More |
| 1010 | Error |
| 1011 | Reserved |
| 1100 | Ready No More Sync |
| 1101–1111 | Reserved |

For alternative embodiments, the inband synchronization control information may be used between any two devices (e.g., a host and peripheral device) over a general purpose time-multiplexed bus in any system to communicate wait state, error, or any other information previously described or summarized in Table 4.

When memory device 108 or I/O device 106 is ready to output its data to LPC bus 124 after providing the appropriate synchronization control information on LAD[3:0] (e.g., 0000), the process transitions to state 524 for n clock cycle(s) T8. In state 524, memory device 108 or I/O device 106 outputs the requested data to LAD[3:0]. Memory device 108 or I/O device 106 may drive data onto LAD[3:0] in byte increments over two clock cycles. For example, if the size control information indicated a 16 bit or two byte transfer, then a first byte may be output in the first two clock cycles, and a second byte may be output in the following two clock cycles. For each byte, data may be output by memory device 108 low nibble first, high nibble first, or in any other format. Similarly, each group of bytes output by memory device 108 may be output low byte first, high byte first, or in any other format.

After all of the data has be read by I/O device 104, the process transitions to turn around (TAR) state 526 in which control of LAD[3:0] may be returned to I/O device 104 during n clock cycle(s) T9. For one embodiment, state 526 is two clocks wide. In the first clock cycle, memory device 108 or I/O device 106 drives LAD[3:0] lines with predetermined control information (e.g., 1111). In the second clock cycle, memory device 108 or I/O device 106 may tri-state LAD[3:0] lines. For other embodiments, n may be one clock cycle or greater than two clock cycles to turn around LAD[3:0].

Figure 7:
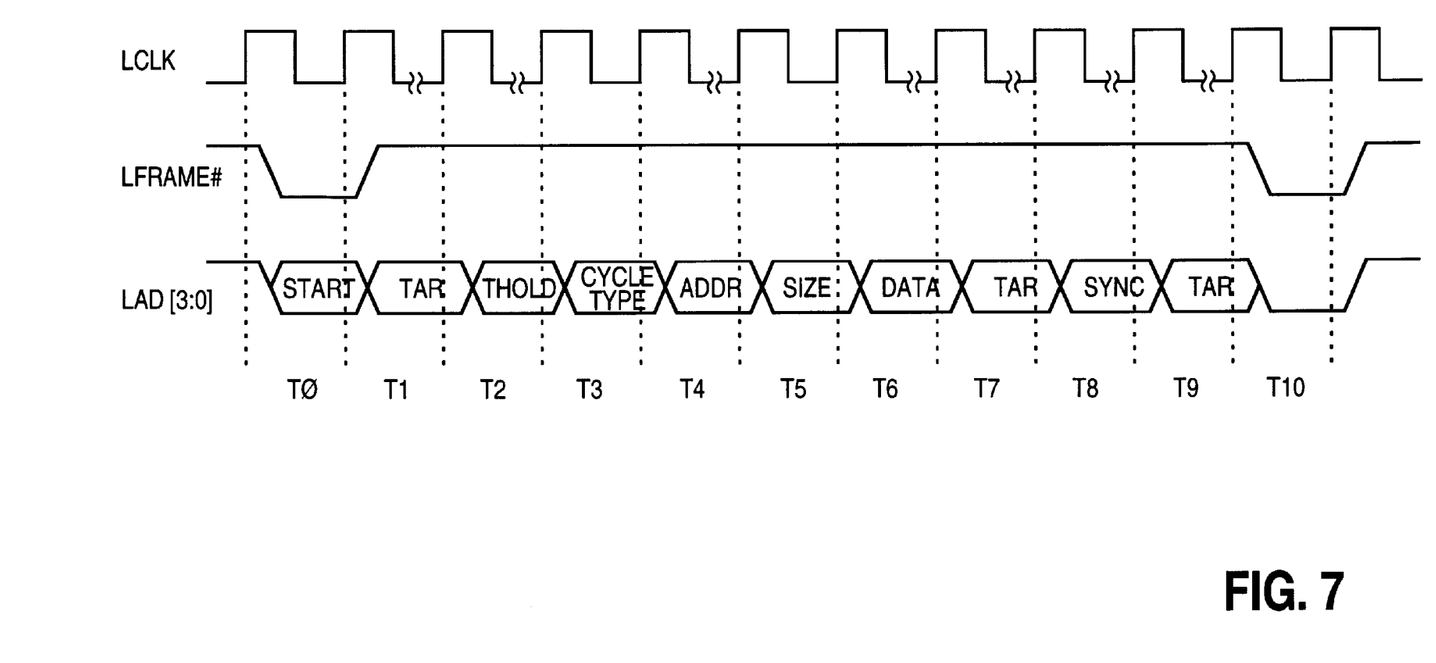
FIG. 7 is one embodiment of a bus master write transaction.

One embodiment of a bus master write transaction of data from, for example, I/O device 104 to I/O device 106 or memory device 108 will be described with the aid of FIG. 5 and the exemplary timing diagram of FIG. 7. The bus master write transaction may comprise I/O device 104 writing data files, driver information, application codes, or the like to a register or FIFO in I/O device 106 or a memory location in memory device 108.

The process begins at idle state 502 when LFRAME# deasserted (e.g., high). When, host 102 is ready to grant I/O device 104 access to the bus for a previously requested bus master transaction, the process transitions to state 504 and host 102 asserts LFRAME# (e.g., low) during cycle T0. The process then transitions to turn around (TAR) state 506 to turn control of LPC bus 124 over I/O device 104 during n clock cycle(s) Ti. The process then transitions to a hold state 508 for n clock cycles T2 to synchronize LPC interface 112 with sampled signals on LAD[3:0]. State 508 is optional and may by omitted.

The process then transitions to state 510 in which I/O device 104 drives cycle type and direction control information on LAD[3:0] during cycle T3 to indicate a bus master write transaction as indicated in Table 2. The process may transitions to state 512 and I/O device 104 may drive an address of a memory location in memory device 108, or an address of a location in I/O device 106, on LAD[3:0] during n clock cycles T4. The process then transitions to state 514 and drives a field of size control information on LAD[3:0] during cycle T5. As previously described, the size control information may indicate the number of bytes of data to be read from or written to memory device 108 or I/O device 106 starting at the address provided in state 512.

The process may then transition to state 516 and write the appropriate bytes of data in n clock cycle(s) T4 to memory device 108 or I/O device 106 over LAD[3:0]. I/O device 104 may drive data onto LAD[3:0] in byte increments over two clock cycles. For example, if the size control information indicated a 16 bit or two byte transfer, then a first byte may be output in the first two clock cycles, and a second byte may be output in the following two clock cycles. For each byte, data may be output by LPC interface 118 low nibble first, high nibble first, or in any other format. Similarly, each group of bytes output by LPC interface 118 may be output low byte first, high byte first, or in any other format.

The process then transitions to turn around (TAR) state 518 to turn control of LPC bus 124 over to memory device 108 or I/O device 106 during n clock cycle(s) T7.

The process may then transition to state 520 and wait n clock cycles while memory device 108 drives inband synchronization control information on LAD[3:0] during clock cycle(s) T8. For one embodiment, the synchronization control information may be one or more clock cycles and used to acknowledge the receipt of the data written into memory device 108 or I/O device 106 (e.g., 0000 on LAD[3:0]). The synchronization control information may also be used to add wait states until the data has been written into and stored by memory device 108. During these wait states, memory device 108 or I/O device 106 may drive short wait state synchronization control information or long wait state synchronization control information on LAD[3:0] as indicated in Table 4. When memory device 108 or I/O device 106 has written the data into the addressed location, memory device 108 or I/O device 106 may drive a ready state on LAD[3:0] (e.g., 0000).

As with a bus master memory read transaction, memory device 108 or I/O device 106 may also send an inband error message over LAD[3:0] (e.g., 1010) to I/O device 104 using the synchronization field of control information. The error message may indicate, for example, that the write transaction did not occur correctly or that some other error has occurred.

After the data has be written into memory device 108 or I/O device 106, The process may transition to turn around (TAR) state 526 in which control of LAD[3:0] may be returned to I/O device 104 during n clock cycle(s) T9.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A system comprising:
    a bus comprising a plurality of general purpose signal lines to carry time- multiplexed address, data, and control information:
    a host coupled to the bus:
    a peripheral controller device coupled to the bus;
    a bus master device coupled to the bus and communicating with the host and the peripheral controller device; and
    a first control line coupled to the host and the bus master device, wherein the bus master device communicates a request signal on the first control line to the host such that the bus master device is able to issue a bus master transaction and communicate directly with the peripheral controller device.

2. The system of claim 1, wherein the bus master device subsequently communicates a direct memory access (DMA) channel number over the first control line to indicate the bus master transaction.

3. The system of claim 2, wherein the bus comprises a second control line for carrying a control signal from the host to the bus master device, and wherein the host provides first control information to the bus together with the control signal to indicate the start of the bus master transaction between the bus master device and the peripheral controller device.

4. The system of claim 3, wherein the bus master device provides second control information to the bus to indicate that the bus master device will read or write data from or to the peripheral controller device.

5. The system of claim 4, wherein the second control information indicates that the bus master transaction comprises the bus master reading data from the peripheral controller device, and wherein the peripheral controller device provides third control information to the bus until the data is ready to be output by the peripheral controller device to the bus.

6. The system of claim 1, wherein the peripheral controller provides control information to the bus to indicate an error in the bus master transaction.

7. The system of claim 1, wherein the host comprises a processor.

8. The system of claim 1, wherein the host comprises a chip set.

9. The system of claim 1, further comprising a second control line coupled to the host and the bus master device to carry a control signal that indicates a low power mode for the bus master device.

10. A system comprising:
    a bus comprising a plurality of general purpose signal lines to carry time- multiplexed address, data, and control information;
    a host coupled to the bus;
    a memory device storing system start-up information;
    a bus master device coupled to the bus, the bus master device communicating with the host and the memory device; and
    a first control line coupled to the host and the bus master device, wherein the bus master device communicates a request signal on the first control line to the host such that the bus master device is able to issue a bus master transaction and communicate directly with the memory device.

11. The system of claim 10, wherein the bus master device subsequently communicates a direct-memory access (DMA) channel number over the first control line to indicate the bus master transaction.

12. The system of claim 11, wherein the bus comprises a second control line for carrying a control signal from the host to the bus master device, and wherein the host provides first control information to the bus together with the control signal to indicate the start of the bus master transaction between the bus master device and the memory device.

13. The system of claim 12, wherein the bus master device provides second control information to the bus to indicate that the bus master device will read or write data from or to the memory device.

14. The system of claim 13, wherein the second control information indicates that the bus master transaction comprises the bus master reading data from the memory device, and wherein the memory device provides third control information to the bus until the data is ready to be output by the memory device to the bus.

15. The system of claim 10, wherein the memory provides control information to the bus to indicate an error in the bus master transaction.

16. The system of claim 10, wherein the host comprises a processor.

17. The system of claim 10, wherein the host comprises a chip set.

18. A method of performing a bus master transaction in a system comprising a host, a bus master device, a peripheral controller device, and a bus comprising a plurality of general purpose signal lines and a separate control line, wherein the peripheral controller device is addressable in I/O address space, the method comprising the steps of:

asserting a request signal on a request line to the host to request access by the bus master device to the bus;

asserting a control signal on the control line to indicate that data on the bus corresponds to a grant of the bus master transaction;

writing first control information from the bus master device to the peripheral controller device on the plurality of general purpose signal lines to indicate that the bus master transaction comprises the bus master device writing a unit of data to the peripheral controller device;

writing second control information from the bus master device to the peripheral controller device on the plurality of general purpose signal lines to indicate an I/O address in the peripheral controller device to which the unit of data will be written; and writing the unit of data to the peripheral controller device from the bus master device via the general purpose signal lines.

19. A method of performing a bus master transaction in a system comprising a host, a bus master device, a peripheral controller device, and a bus comprising a plurality of general purpose signal lines and a separate control line, wherein the peripheral controller device is addressable in I/O address space, the method comprising the steps of:

asserting a request signal on a request line to the host to request access by the bus master device to the bus;

asserting a control signal on the control line to indicate that data on the bus corresponds to a grant of the bus master transaction;

writing first control information from the bus master device to the peripheral controller device on the plurality of general purpose signal lines to indicate that the bus master transaction comprises the bus master device reading a unit of data from the peripheral controller device;

writing second control information from the bus master device to the peripheral controller device on the plurality of general purpose signal lines to indicate an I/O address in the peripheral controller device from which the unit of data will be read;

turning control of the bus to the peripheral controller device; and reading the unit of data from the peripheral controller device via the general purpose signal lines.

20. The method of claim 10, after the turning step and before the reading step, writing third control information from the peripheral controller device to the general purpose signal lines until the unit of data is ready to be read from the peripheral controller device.

21. The method of claim 20, wherein the third control information comprises an indication of an error in the bus master transaction.

22. A method of performing a bus master transaction in a system comprising a host, a bus master device, a memory device storing system start-up information, and a bus comprising a plurality of general purpose signal lines and a separate control line, wherein the memory device is addressable in memory space, the method comprising the steps of:

asserting a request signal on a request line to the host to request access by the bus master device to the bus;

asserting a control signal on the control line to indicate that data on the bus corresponds to a grant of the bus master transaction;

writing first control information from the bus master device to the memory device on the plurality of general purpose signal lines to indicate that the bus master transaction comprises the bus master device writing a unit of data to the memory device;

writing second control information from the bus master device to the memory device on the plurality of general purpose signal lines to indicate a memory address in the memory device to which the unit of data will be written; and writing the unit of data to the memory device from the bus master device via the general purpose signal lines.

23. A method of performing a bus master transaction in a system comprising a host, a bus master device, a memory device storing system start-up information, and a bus comprising a plurality of general purpose signal lines and a separate control line, wherein the memory device is addressable in memory space, the method comprising the steps of:

asserting a request signal on a request line to the host to request access by the bus master device to the bus;

asserting a control signal on the control line to indicate that data on the bus corresponds to a grant of the bus master transaction;

writing first control information from the bus master device to the memory device on the plurality of general purpose signal lines to indicate that the bus master transaction comprises the bus master device reading a unit of the system start-up information from the memory device;

writing second control information from the bus master device to the memory device on the plurality of general purpose signal lines to indicate a memory address in the memory device from which the unit of system start-up information will be read;

turning control of the bus to the memory device; and reading the unit of system start-up information from the memory device via the general purpose signal lines.

24. The method of claim 23, after the turning step and before the reading step, writing third control information from the memory device to the general purpose signal lines until the system start-up information is ready to be read from the memory device.

25. The method of claim 24, wherein the third control information comprises an indication of an error in the bus master transaction.

26. A method of performing a bus master transaction in a system comprising a host, first and second peripheral controller devices, a bus comprising a plurality of general purpose signal lines that carry time- multiplexed address, data, and control information, and a first control line coupled between the first peripheral controller device and the host, the method comprising:

transmitting a bus master request from the first peripheral controller device to the host via the first control line coupled between the first peripheral controller device and the host;

writing first control information from the host to the first peripheral controller device via the general purpose signal lines to indicate the start of a bus master transaction; and writing second control information from the first peripheral controller device to the second peripheral controller device via the general purpose signal lines to indicate the type of bus master transaction.

27. The method of claim 26, wherein transmitting comprises serially transmitting an encoded direct-memory access (DMA) channel number request from the first peripheral controller device to the host, the encoded direct-memory access channel number identifying the request as a bus master request for the first peripheral controller device to gain access to the bus.

28. The method of claim 26, further comprising transmitting a bus master request from the second peripheral controller device to the host via a second control line coupled between the second peripheral controller device and the host, wherein the first control information indicates which of the first and second peripheral controller devices is granted access to the bus.

29. The method of claim 26, further writing synchronization control information from the second peripheral controller device to the first peripheral controller device to add wait states until data in the second peripheral controller device is ready for operation.

30. The method of claim 29, wherein the second control information indicates a bus master read transaction from the second peripheral controller device, the method further writing address information from the first peripheral controller device to the second peripheral controller device corresponding to the address in the second peripheral controller device from which a unit of data will be read.

31. The method of claim 30 further reading data from the second peripheral controller device to the first peripheral controller device via the general purpose signal lines.

32. The method of claim 29, wherein the second control information indicates a bus master write transaction from the second peripheral controller device, the method further writing address information from the first peripheral controller device to the second peripheral controller device corresponding to the address in the second peripheral controller device in which a unit of data will be written.

33. The method of claim 32 further writing data from the first peripheral controller device to the second peripheral controller device via the general purpose signal lines.

* * * * *

UNITED STATES PATENT AND TRADEMARK OFFICE
CERTIFICATE OF CORRECTION

PATENT NO.   : 6,119,189
DATED        : September 12, 2000
INVENTOR(S)  : Gafken et al.

It is certified that error appears in the above-identified patent and that said Letters Patent is hereby corrected as shown below:

Column 6,
Line 22, delete "on may be used" and insert -- on the same or other signal lines may be used --.

Column 8,
Line 14, delete "cycles Ti, T2," and insert -- cycles T1, T2, --.
Line 20, delete "cycles Ti, T2," and insert -- cycles T1, T2, --.

Column 9,
Line 3, delete "cycle TO" and insert -- cycle T0 --.
Lines 5-6, delete "cycles TO" and insert -- cycles T0 --.
Line 29, delete "2; :".

Column 12,
Line 41, delete "Ti" and insert -- T1 --.

Column 15,
Line 54, delete "method of claim 10" and insert -- method of claim 19 --.

Signed and Sealed this

Twenty-seventh Day of August, 2002

Attest:

JAMES E. ROGAN
Attesting Officer           Director of the United States Patent and Trademark Office